US009807626B2

(12) United States Patent
Gao

(10) Patent No.: US 9,807,626 B2
(45) Date of Patent: Oct. 31, 2017

(54) PROCESSING METHOD OF WIRELESS FIDELITY TECHNOLOGY AND USER EQUIPMENT

(71) Applicant: HUAWEI TECHNOLOGIES CO., LTD., Shenzhen (CN)

(72) Inventor: Wen Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 403 days.

(21) Appl. No.: 14/311,805

(22) Filed: Jun. 23, 2014

(65) Prior Publication Data

US 2014/0313877 A1 Oct. 23, 2014

Related U.S. Application Data

(63) Continuation of application No. PCT/CN2012/086758, filed on Dec. 17, 2012.

(30) Foreign Application Priority Data

Dec. 21, 2011 (CN) .......................... 2011 1 0432925

(51) Int. Cl.
*H04W 24/04* (2009.01)
*H04W 76/02* (2009.01)
*H04W 72/04* (2009.01)

(52) U.S. Cl.
CPC ......... *H04W 24/04* (2013.01); *H04W 72/042* (2013.01); *H04W 72/0413* (2013.01); *H04W 76/027* (2013.01); *H04W 76/028* (2013.01)

(58) Field of Classification Search
CPC ........... H04L 65/1093; H04L 65/1069; H04W 76/021; H04W 24/04; H04W 76/027;
(Continued)

(56) References Cited

U.S. PATENT DOCUMENTS

2005/0083971 A1 4/2005 Delaney et al.
2005/0176437 A1* 8/2005 Mir ....................... H04W 56/00 455/450

(Continued)

FOREIGN PATENT DOCUMENTS

CN 101668322 A 3/2010
CN 102215530 A 10/2011

(Continued)

OTHER PUBLICATIONS

Extended European Search Report dated Nov. 10, 2014 in corresponding European Patent Application No. 12860966.6 (13 pages).

(Continued)

*Primary Examiner* — Kan Yuen
*Assistant Examiner* — Richard Chang
(74) *Attorney, Agent, or Firm* — Staas & Halsey LLP

(57) ABSTRACT

Embodiments of the present invention disclose a processing method of a wireless fidelity technology and a user equipment, where implementation of the method includes: detecting whether a radio link failure occurs at an air interface of a wireless fidelity network; resetting a bottom layer of the wireless fidelity network, and suspending a radio bearer to an access point of the wireless fidelity network, when it is detected that the radio link failure occurs at the air interface of the wireless fidelity network, during a process that a base station distributes mobile data for a user equipment by using the wireless fidelity technology; and restoring the radio bearer to the access point of the wireless fidelity network, when the resetting of the bottom layer of the wireless fidelity network is completed, and it is detected that the air interface of the wireless fidelity network is restored to be normal.

13 Claims, 10 Drawing Sheets

301
A UE detects that an RLF occurs at an air interface of a WiFi side

302
The UE does not initiate an RRC connection re-establishing process, the UE resets a bottom layer of the WiFi side, suspends all the bearers for communicating with a WiFi AP, and stops a data transmission process with the WiFi AP. The UE accumulates the number of reset times 303
After the resetting of the bottom layer of the WiFi side is completed, if the UE detects that the air interface of the WiFi side is not restored to be normal, the UE determines a subsequent action according to whether the number of successive reset times of the air interface of the WiFi side reaches the maximum number of reset times 304
The eNB may re-configure the radio bearer (RB) originally distributed to the WiFi side to an LTE side, and meanwhile notify the UE of duration of re-detection of the WiFi 305
After receiving the re-configuration, the UE restores the originally suspended RB, and forwards the RB to the LTE side. Meanwhile, according to the duration of re-detection of WiFi, the UE turns on the WiFi on time to detect whether the WiFi is restored, and notifies the eNB of a WiFi restoring message. After knowing that the WiFi is restored, the eNB may send a re-configuration message, so as to re-configure a part of RBs to the WiFi side for performing the distribution

(58) Field of Classification Search
CPC ........... H04W 76/028; H04W 72/0413; H04W 72/042
USPC .................................................. 370/328, 216
See application file for complete search history.

(56) References Cited

U.S. PATENT DOCUMENTS

| | | | | |
|---|---|---|---|---|
| 2007/0099653 | A1* | 5/2007 | Parron | H04W 76/028 455/552.1 |
| 2010/0124173 | A1 | 5/2010 | Agashe et al. | |
| 2013/0114583 | A1* | 5/2013 | Park | H04W 52/0216 370/338 |
| 2014/0079007 | A1 | 3/2014 | Li et al. | |

FOREIGN PATENT DOCUMENTS

| | | |
|---|---|---|
| CN | 102217353 A | 10/2011 |
| CN | 102223658 A | 10/2011 |

OTHER PUBLICATIONS

ETSI: "*LTE; Evolved Universal Terrestrial Radio Access* (*E-UTRA*); *Radio Resource Control* (*RRC*); *Protocol specification*", 3GPP TS 36.311 Version 10.1.0 Release 10, Jan. 1, 2011 (Jan. 1, 2011), XP055131794, sections 5.3.5.3, 5.3.7.1, 5.3.7.2, 5.3.11.1, 5.3.11.2, 5.3.11.3, 5.4.3.1 (292 pages).

Chinese Office Action dated Jan. 26, 2015 in corresponding Chinese Patent Application No. 201110432925.X (7 pages).

"*New Study Item Proposal for Opportunistic Carrier Aggregation across 3GPP-LTE and WLAN*"; 3GPP TSG RAN#53, RP-111094; Fukuoka, Japan, Sep. 13-16, 2011; Intel Corporation, Vodafone (5 pages).

"*Discussions on Carrier Aggregation across LTE and WIFI*"; 3GPP TSG-RAN meeting #53, RP-111094; Fukuoka, Japan, Sep. 13-16, 2011; Intel Corporation (4 pages).

PCT International Search Report and Written Opinion—Forms PCT/ISA/210, PCT/ISA/220 and PCT/ISA/237 dated Dec. 17, 2012 in corresponding International Application No. PCT/CN2012/086758 (10 pages).

* cited by examiner

PROCESSING METHOD OF WIRELESS FIDELITY TECHNOLOGY AND USER EQUIPMENT

CROSS-REFERENCE TO RELATED APPLICATIONS

This application is a continuation of International Application No. PCT/CN2012/086758, filed on Dec. 17, 2012, which claims priority to Chinese Patent Application No. 201110432925.X, filed on Dec. 21, 2011, both of which are hereby incorporated by reference in their entireties.

TECHNICAL FIELD

Embodiments of the present invention relate to the field of mobile communications technologies, and in particular, to a processing method of a wireless fidelity technology and a user equipment.

BACKGROUND

With increasing of mobile Internet services, data amount in a wireless communication network surges, which accelerates demands for bandwidths. In order to alleviate congestion of a mobile cellular network, a network operator needs to deploy more base stations to improve network capacity, which inevitably results in increasing of investment cost and maintenance cost. In order to solve the conflict, increasingly more network operators select a mobile data distribution manner, where a part of data in the mobile network is distributed to other available access technologies, so as to be used as compensation of the mobile network. Recently, the most important compensation network technologies used for the mobile data distribution include WiFi (Wireless Fidelity, wireless fidelity), a home base station and so on.

The WiFi, being a standard of a WLAN (Wireless Local Access Network, wireless local access network), is a communication network composed of a wireless network card and an AP (Access Point, access point). The AP is generally called a network bridge or an access point, connecting a wired local access network and the wireless local access network; a user equipment with a wireless network card may share resources of the wired local access network or even a wide area network through the AP, where a working principle of the AP is equivalent to a HUB (hub) or a router with a built-in radio transmitter; and the wireless network card is located in the user equipment and is responsible for receiving a signal transmitted by the AP.

LTE (Long Term Evolved, long term evolved network) is a mobile communication network actively researched by every manufacturer in the 3GPP (3rd Generation Partnership Program, 3rd generation partnership program) organization, and is an evolved network of a UMTS (Universal Mobile Telecommunication System, universal mobile telecommunication system). The objective of LTE is to provide a low-cost network capable of reducing time delay, increasing a user data rate, and increasing system capacity and coverage. An air interface of the LTE network is implemented by deploying the base station, and the UE (User Equipment, user equipment) communicates with the base station, so as to implement air interface transmission of the mobile service.

In the LTE technology, the data transmitted at the air interface is borne on different RBs (Radio Bearer, radio bearer) according to QoS (Quality of Service, Quality of Service) and other information, where an SRB (Signaling Radio Bearer, signaling radio bearer) is used to bear an RRC (Radio Resource Control, radio link control) message, that is: RRC signaling; and a DRB (Data Radio Bearer, data radio bearer) is used to bear data. During and/or after a process that the base station establishes the RRC with the UE, the base station may configure one or more RBs for the UE, for bearing different types of data.

In the existing 3GPP standard, the solution of supporting the WLAN to perform the distribution for the UMTS or LTE network is mainly performed in an EPS (Evolved Packet System, evolved packet system) of a core network. Through configuration, different traffic flows are distributed to the wireless air interface of the UMTS/LTE or the WLAN in the network for transmission. A distribution point of the solution is at the core network side.

In addition, a distribution point of another distribution solution is at an access network side of the LTE or UMTS, for example, a base station of the LTE, or an RNC (Radio Network Controller, wireless network controller) of the UMTS. As compared with the distribution performed at the core network side, the WiFi distribution performed at the access network side has an advantage that: the access network side is closer to air interface transmission, so as to acquire state information of the air interface transmission in real time, so that distribution scheduling may be adjusted in real time according to the state of the air interface transmission, thereby acquiring better data transmission efficiency. Taking the WiFi distribution performed in the base station of the LTE as an example, the solution of performing the WiFi distribution in the base station is distribution based on an IP layer, that is, IP packet data of a user plane from an S1 interface is distributed to an access layer of the LTE and an access layer of the WiFi through a distribution scheduling policy, so as to perform air interface transmission through a Uu interface of the LTE and an 802.11 interface of the WiFi. In addition to the IP layer distribution solution, the distribution may be performed in a PDCP (Packet Data Convergence Protocol, packet data convergence protocol) layer, an RLC (Radio Link Control, radio link control) layer, and a MAC (Medium Access Control, medium access control) layer. In the distribution solutions, distribution points are put under the LTE PDCP layer, the RLC layer, and the MAC layer for performing the distribution.

In addition to layer difference of the distribution points, according to the distribution policy, the WiFi distribution may be classified into distribution performed according to packets and distribution performed according to bearers. In the distribution performed according to packets, all the bearer data transmitted by the core network through the S1 interface is distributed to the air interface side of the LTE and the WiFi according to the distribution scheduling policy; and in the distribution performed according to bearers, according to the configuration, some bearers are distributed to the air interface of the LTE side for transmission, and the other bearers are distributed to the air interface of the WiFi side for transmission, and before the configuration is not changed, distribution directions of the bearers are determined.

During the implementation process of the present invention, the inventor finds that in the LTE technology, when an RLF (Radio Link Failure, radio link failure) is detected, the UE may initiate an RRC (Radio Resource Control, radio resource control) connection re-establishing process. Generally, there are three conditions for determining that the RLF occurs:

(1) A physical link problem: when successively receiving N310 “out-of-sync (out-of-sync)” indications from the physical layer, the RRC layer of the UE starts a T310 timer; after the T310 timer expires, the RRC layer of the UE determines that the RLF occurs. Before the T310 expires, when successively receiving N311 “in-sync (in-sync)” indications from the physical layer, the RRC layer of the UE stops the T310 timer, so as to restore the link.

(2) After receiving a random access problem indication sent by a MAC (Media Access Control, medium access control) layer, the RRC of the UE determines that the RLF occurs.

(3) After the RRC layer of the UE receives an indication that re-transmission reaches the maximum number of times sent by an RLC (Radio Link Control, radio link control) layer, the UE determines that the RLF occurs.

Recently, the industry only has an accessing solution when the RLF occurs at the LTE side, but does not provide an accessing solution when the RLF occurs at the WiFi side.

SUMMARY

Embodiments of the present invention provide a processing method of wireless fidelity and a user equipment, which implement UE access after an RLF occurs at a WiFi side, so as to ensure that a distribution service is smooth.

A processing method of a wireless fidelity technology includes:

detecting whether a radio link failure occurs at an air interface of a wireless fidelity network;

resetting a bottom layer of the wireless fidelity network, and suspending a radio bearer to an access point of the wireless fidelity network, when it is detected that the radio link failure occurs at the air interface of the wireless fidelity network, during a process that a base station distributes mobile data for a user equipment by using the wireless fidelity technology; and restoring the radio bearer to the access point of the wireless fidelity network, when the resetting of the bottom layer of the wireless fidelity network is completed, and it is detected that the air interface of the wireless fidelity network is restored to be normal.

A processing method of a wireless fidelity technology includes:

detecting whether a radio link failure occurs at an air interface of a wireless fidelity network;

initiating a radio resource control connection re-establishing procedure, and resetting a bottom layer of the wireless fidelity network, when it is detected that the radio link failure occurs at the air interface of the wireless fidelity network, and a signaling radio bearer is distributed to the wireless fidelity network, during a process that a base station distributes mobile data for a user equipment by using the wireless fidelity technology;

receiving a first re-configuration indication sent by the base station, after radio resource control connection re-establishing is finished; and restoring, according to the first re-configuration indication, a radio bearer to the base station, and restoring a radio bearer to an access point of the wireless fidelity network, when it is detected that the air interface of the wireless fidelity network is restored to be normal.

A user equipment includes:

a detecting unit, configured to detect whether a radio link failure occurs at an air interface of a wireless fidelity network;

a processor, configured to reset a bottom layer of the wireless fidelity network, and suspend a radio bearer to an access point of the wireless fidelity network, when it is detected that the radio link failure occurs at the air interface of the wireless fidelity network, during a process that a base station distributes mobile data for a user equipment by using a wireless fidelity technology; and a control unit, configured to restore the radio bearer to the access point of the wireless fidelity network, when the resetting of the bottom layer of the wireless fidelity network is completed, and it is detected that the air interface of the wireless fidelity network is restored to be normal.

A user equipment includes:

a detecting unit, configured to detect whether a radio link failure occurs at an air interface of a wireless fidelity network;

a processor, configured to initiate a radio resource control connection re-establishing procedure, and reset a bottom layer of the wireless fidelity network, when it is detected that the radio link failure occurs at the air interface of the wireless fidelity network, and a signaling radio bearer is distributed to the wireless fidelity network, during a process that a base station distributes mobile data for a user equipment by using a wireless fidelity technology;

a receiver, configured to receive a first re-configuration indication sent by the base station, after radio resource control connection re-establishing is finished; and a control unit, configured to restore, according to the first re-configuration indication, a radio bearer to the base station, and restore a radio bearer to an access point of the wireless fidelity network, when it is detected that the air interface of the wireless fidelity network is restored to be normal.

It may be seen from the above technical solutions that the embodiments of the present invention have the following advantages: The bottom layer of the wireless fidelity side is reset, and the radio bearer to the access point is suspended, if the radio link failure occurs at the air interface of the wireless fidelity side, during the process that the base station distributes the mobile data for the user equipment by using the wireless fidelity; and the radio bearer for communicating with the access point is restored or data transmission of the wireless fidelity side is restored, after it is detected that the air interface of the wireless fidelity side is restored to be normal, thereby implementing the UE access after the RLF occurs at the WiFi side, so as to ensure that the distribution service is smooth.

BRIEF DESCRIPTION OF DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

In order to make the objectives, technical solutions, and advantages of the present invention comprehensible, the present invention will be further described below with reference to the accompanying drawings. It is obvious that the embodiments to be described are only a part rather than all of the embodiments of the present invention. All other embodiments derived by persons skilled in the art based on the embodiments of the present invention without carrying out creative activities should fall within the scope of the present invention. It should be noted that "first", "second, and "third" are used in the embodiments of the present invention, which are only used for differentiating different names instead of being used for other limitations, and shall not be construed as limitations to the present invention.

Figure 1:
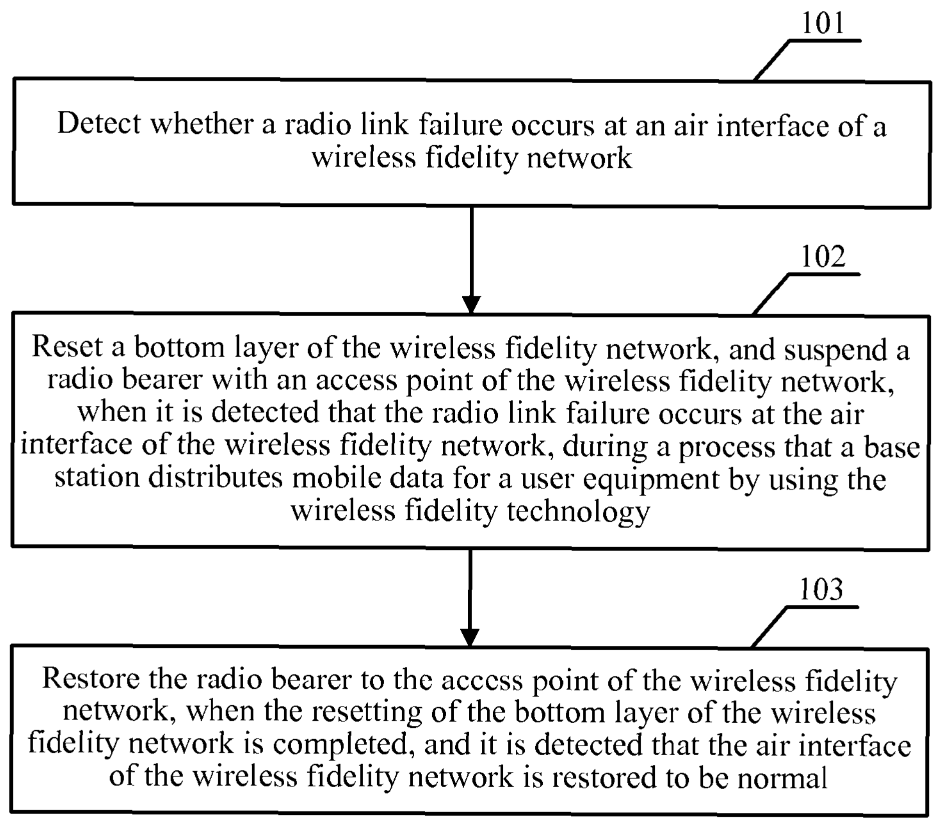
FIG. 1 is a schematic flowchart of a method according to an embodiment of the present invention.

An embodiment of the present invention provides a processing method of wireless fidelity, as shown in FIG. 1, including:

101: Detect whether a radio link failure occurs at an air interface of a wireless fidelity network.

In 101, the detecting whether the radio link failure occurs at the air interface of the wireless fidelity network includes: any one of detecting whether a radio link failure notification sent by a bottom layer of the wireless fidelity network is received, detecting whether a packet loss ratio exceeds a preset value, and detecting whether the number of re-transmission times of a radio link control message of the wireless fidelity network reaches a threshold. It can be understood that it is possible that other situations result in the radio link failure, and the above three examples should not be understood as exhaustion of examples of radio link failures, so that the above examples should not be understood as the limitation of the embodiment of the present invention.

102: Reset a bottom layer of the wireless fidelity network, and suspend a radio bearer to an access point of the wireless fidelity network, when it is detected that the radio link failure occurs at the air interface of the wireless fidelity network, during a process that a base station distributes mobile data for a user equipment by using the wireless fidelity technology.

In the step, the manner of determining whether the WiFI is restored to be normal may be that: the bottom layer of the WiFi side provides an indication, which indicates whether data can be normally sent and received. The resetting (Reset) refers to the resetting of the bottom layer of the WiFI implemented through rebooting of the WiFi side. The resetting may refer to rebooting of a PHY (Physical, physical) layer/MAC (Medium Access Control, medium access control) layer of the WiFi side, and specifically, the rebooting of the bottom layer of the WiFi side may be that: configuration data of the PHY layer/MAC layer is restored to data during an initial state, so as to implement the resetting of the bottom layer of the WiFi side. In this embodiment, the suspending (Suspend) the radio bearer refers to that the bearer is made to be in a sleep state, and at this time, the data cannot be sent, received, or processed. In this embodiment, when being reset, the bottom layer of the Wifi may not send and receive the data during a period of time, so that the suspending the RB may prevent the data from being sent to the bottom layer of the WiFi for being processed at this time.

103: Restore the radio bearer to the access point of the wireless fidelity network, when the resetting of the bottom layer of the wireless fidelity network is completed, and it is detected that the air interface of the wireless fidelity network is restored to be normal.

In the above embodiment, the bottom layer of the wireless fidelity side is reset, and the radio bearer to the access point is suspended, if the radio link failure occurs at the air interface of the wireless fidelity side, during the process that the base station distributes the mobile data for the user equipment by using the wireless fidelity; and the radio bearer for communicating with the access point is restored, after it is detected that the air interface of the wireless fidelity side is restored to be normal, thereby implementing the UE access after the RLF occurs at the WiFi side, so as to ensure that the distribution service is smooth.

Further, after the resetting of the bottom layer of the wireless fidelity network is completed, and when the air interface of the wireless fidelity network is still not restored to be normal, a first message is sent to the base station to inform the base station of a wireless fidelity failure. This embodiment provides a solution after the resetting of the bottom layer of the wireless fidelity network is completed, and when the air interface of the wireless fidelity network is still not restored to be normal, thereby implementing the UE access after the RLF occurs at the WiFi side, so as to ensure that the distribution service is smooth.

Optionally, before the sending the first message (which may be a wireless fidelity failure indication) to the base station to inform the base station of the wireless fidelity failure, the method further includes: accumulating the number of reset times of the bottom layer of the wireless fidelity network, and determining whether the number of reset times of the bottom layer of the wireless fidelity network reaches a preset threshold; if yes, and the air interface of the wireless fidelity network is not restored to be normal, executing: sending the first message to the base station to inform the base station of the wireless fidelity failure; and if no, continuing to reset the bottom layer of the wireless fidelity network. This embodiment provides an optional solution of determining whether the bottom layer of the wireless network is restored to be normal, thereby implementing the UE access after the RLF occurs at the WiFi side, so as to ensure that the distribution service is smooth.

Further, after the sending the first message to the base station to inform the base station of the wireless fidelity failure, the method further includes: receiving a re-configuration indication sent by the base station, where the re-configuration indication is that a radio bearer distributed to the wireless fidelity network is to be re-configured to a designated network. The re-configuration indication may be that the radio bearer distributed to the wireless fidelity network is scheduled to the designated network, and specific scheduling may be implemented on a MAC layer. It should be noted that the re-configuration indication may be implemented through an RRC re-configuration message, where a direction of distributing the RB may be changed through the RRC re-configuration message. In this embodiment, on the basis of the above embodiments, the base station sends the re-configuration indication to control the network access, thereby implementing the UE access after the RLF occurs at the WiFi side, so as to ensure that the distribution service is smooth.

Further, the method further includes: receiving an indication sent by the base station, where the indication is used to indicate duration of re-detection of wireless fidelity; detecting, according to the indication, whether the air interface of the wireless fidelity network is restored to be normal; and if yes, sending a second message to the base station, so as to inform the base station that the air interface of the wireless fidelity network is restored to be normal, and acquiring the radio bearer distributed to the wireless fidelity network and configured by the base station.

This embodiment provides an optional processing solution for restoring the state of the air interface of the wireless fidelity network, thereby implementing the UE access after the RLF occurs at the WiFi side, so as to ensure that the distribution service is smooth.

The above solutions may be applied to application scenarios of performing distribution according to packets and according to bearers. In the following, examples are given for the distribution performed according to packets and according to bearers. In the embodiment in the following, one side of the distribution is WiFi, and the other side is LTE, where it should be noted that the other side may be other networks, for example, a UMTS (Universal Mobile Telecommunication System, universal mobile telecommunication system), so that the example of the other side network corresponding to the WiFi should not be understood as the limitation of the embodiment of the present invention.

Figure 2:
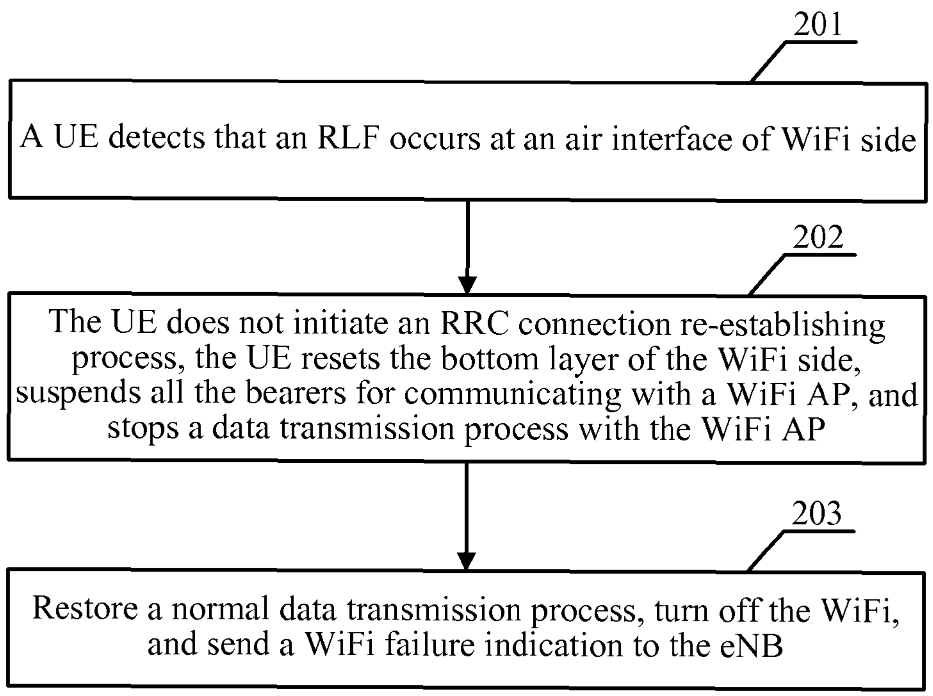
FIG. 2 is a schematic flowchart of a method according to an embodiment of the present invention.

Another embodiment of the present invention, as shown in FIG. 2, includes:

201: A base station distributes mobile data for a UE by using a WiFi technology. During a data transmission process, the UE detects that an RLF occurs at an air interface of a WiFi side.

In this embodiment, the distribution of the data is based on an RB, that is, when the base station instructs the UE to perform data distribution, the base station needs to configure that the data of which RB or RBs of the UE is distributed by using WiFi (where it is not differentiated whether an SRB may be distributed).

More specifically, the detecting, by the UE, that the RLF occurs at the air interface of the WiFi side includes: (1) a bottom layer of the WiFi side notifies the UE that a link failure occurs at a distribution scheduling layer; (2) a statistic packet loss ratio fed back by the bottom layer of the WiFi side is quite high; and (3) the number of re-transmission times of RLC on the bearer configured to the WiFi side reaches the maximum number of times.

202: The UE does not initiate an RRC connection re-establishing process, the UE resets the bottom layer of the WiFi side, suspends all the bearers for communicating with a WiFi AP, and stops a data transmission process with the WiFi AP.

In this embodiment, the UE may further accumulate the number of reset times.

203: After the resetting of the bottom layer of the WiFi side is completed, if the UE detects that the air interface of the WiFi side is restored to be normal, the UE restores all the RBs for communicating with the WiFi AP, and restores a normal data transmission process.

In this embodiment, the UE may clear the number of reset times.

Further, after the resetting of the bottom layer of the WiFi side is completed, if the UE detects that the air interface of the WiFi side is not restored to be normal, the UE may turn off the WiFi and send a WiFi failure indication to the eNB base station, so as to inform the eNB base station that a failure occurs at the WiFi.

More specifically, if the number of successive reset times does not reach the maximum number of reset times, the UE continues resetting the bottom layer of the WiFi side and accumulates the number of reset times. If the number of successive reset times reaches the maximum number of reset times, the UE turns off the WiFi and sends the WiFi failure indication to the base station.

Further, after receiving the WiFi failure indication sent by the UE, the base station may re-configure the radio bearer (RB) originally distributed to the WiFi side to an LTE side, and meanwhile notify the UE of duration of re-detection of the WiFi. After receiving the re-configuration, the UE restores the originally suspended RB, and forwards the RB to the LTE side. Meanwhile, according to the duration of re-detection of WiFi, the UE turns on the WiFi on time to detect whether the WiFi is restored, and notifies the base station of a WiFi restoring message. After knowing that the WiFi is restored, the base station may send a re-configuration message, so as to re-configure a part of RBs to the WiFi side for performing the distribution.

This embodiment provides an optional processing solution for restoring the state of the air interface of the wireless fidelity network, thereby implementing the UE access after the RLF occurs at the WiFi side, so as to ensure that the distribution service is smooth.

Figure 3:
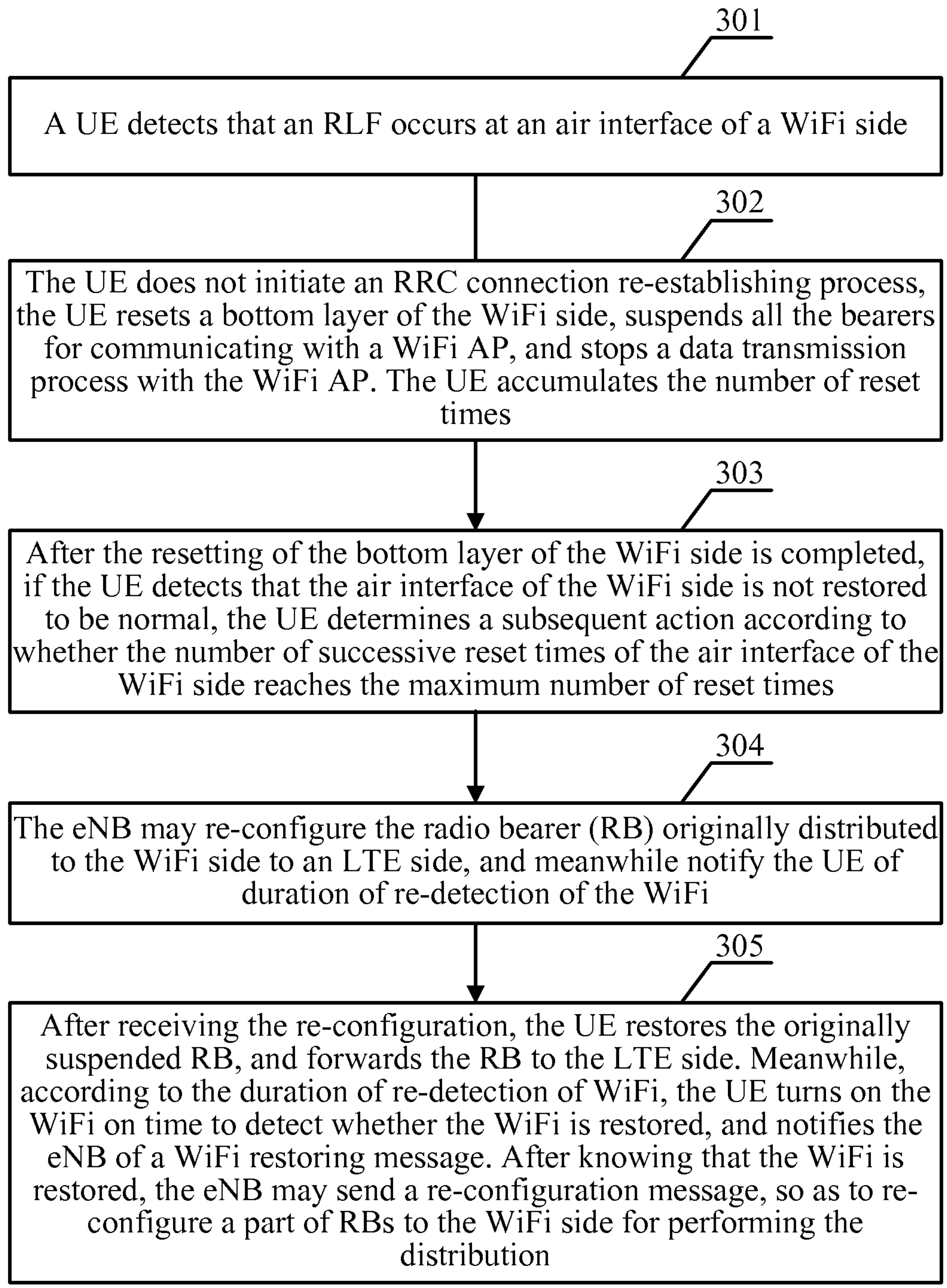
FIG. 3 is a schematic flowchart of a method according to an embodiment of the present invention.

According to another embodiment of the present invention, as shown in FIG. 3, the procedure includes:

301: A base station distributes mobile data for a UE by using a WiFi technology. During a data transmission process, the UE detects that an RLF occurs at an air interface of a WiFi side.

In this embodiment, the distribution of the data is based on an RB, that is, when the base station instructs the UE to perform data distribution, the base station needs to configure that the data of which RB or RBs of the UE is distributed by using WiFi (where it is not differentiated whether an SRB may be distributed).

More specifically, the detecting, by the UE, that the RLF occurs at the air interface of the WiFi side includes: (1) a bottom layer of the WiFi side notifies the UE that a link failure occurs at a distribution scheduling layer; (2) a statistic packet loss ratio fed back by the bottom layer of the WiFi side is quite high; and (3) the number of re-transmission times of RLC on the bearer configured to the WiFi side reaches the maximum number of times.

302: The UE does not initiate an RRC connection re-establishing process, the UE resets the bottom layer of the WiFi side, suspends all the bearers for communicating with a WiFi AP, and stops a data transmission process with the WiFi AP.

In this embodiment, the UE may further accumulate the number of reset times.

303: After the resetting of the bottom layer of the WiFi side is completed, if the UE detects that the air interface of the WiFi side is not restored to be normal, the UE determines a subsequent action according to whether the number of successive reset times of the air interface of the WiFi side reaches the maximum number of reset times.

More specifically, if the number of successive reset times does not reach the maximum number of reset times, the UE continues resetting the bottom layer of the WiFi side and accumulates the number of reset times. If the number of successive reset times reaches the maximum number of reset times, the UE turns off the WiFi and sends a WiFi failure indication to the base station.

304: After receiving the WiFi failure indication sent by the UE, the base station may re-configure the radio bearer (RB) originally distributed to the WiFi side to an LTE side, and meanwhile notify the UE of duration of re-detection of the WiFi.

305: After receiving the re-configuration, the UE restores the originally suspended RB, and forwards the RB to the LTE side. Meanwhile, according to the duration of re-detection of WiFi, the UE turns on the WiFi on time to detect whether the WiFi is restored, and notifies the base station of a WiFi restoring message. After knowing that the WiFi is restored, the base station may send a re-configuration message, so as to re-configure a part of RBs to the WiFi side for performing the distribution.

This embodiment provides an optional processing solution for restoring the state of the air interface of the wireless fidelity network, thereby implementing the UE access after the RLF occurs at the WiFi side, so as to ensure that the distribution service is smooth.

Figure 4:
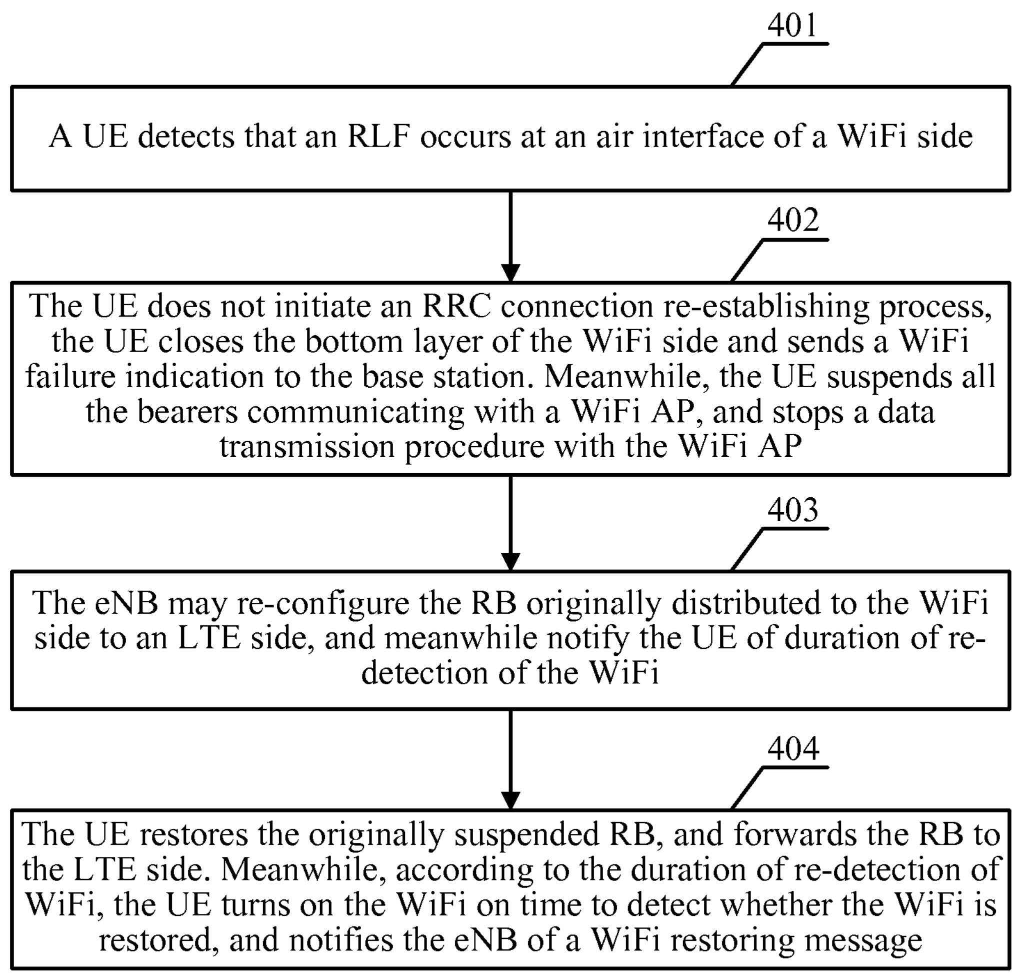
FIG. 4 is a schematic flowchart of a method according to an embodiment of the present invention.

According to another embodiment of the present invention, as shown in FIG. 4, the procedure includes:

401: A base station distributes mobile data for a UE by using a WiFi technology. During a data transmission process, the UE detects that an RLF occurs at an air interface of a WiFi side.

In this embodiment, the distribution of the data is based on an RB, that is, when the base station instructs the UE to perform data distribution, the base station needs to configure that the data of which RB or RBs of the UE is distributed by using WiFi (where it is not differentiated whether an SRB may be distributed).

More specifically, the detecting, by the UE, that the RLF occurs at the air interface of the WiFi side includes: (1) a bottom layer of the WiFi side notifies the UE that a link failure occurs at a distribution scheduling layer; (2) a statistic packet loss ratio fed back by the bottom layer of the WiFi side is quite high; and (3) the number of re-transmission times of RLC on the bearer configured to the WiFi side reaches the maximum number of times.

402: The UE does not initiate an RRC connection re-establishing process, the UE closes the bottom layer of the WiFi side and sends a WiFi failure indication to the base station. Meanwhile, the UE suspends all the bearers for communicating with a WiFi AP, and stops a data transmission process with the WiFi AP.

403: After receiving the WiFi failure indication sent by the UE, the base station may re-configure the RB originally distributed to the WiFi side to an LTE side, and meanwhile notify the UE of duration of re-detection of the WiFi.

404: After receiving the re-configuration, the UE restores the originally suspended RB, and forwards the RB to the LTE side.

In this embodiment, meanwhile, according to the duration of re-detection of WiFi, the UE turns on the WiFi on time to detect whether the WiFi is restored, and notifies the eNB base station of a WiFi restoring message. After knowing that the WiFi is restored, the eNB base station may send a re-configuration message, so as to re-configure a part of RBs to the WiFi side for performing the distribution.

This embodiment provides an optional processing solution for restoring the state of the air interface of the wireless fidelity network, thereby implementing the UE access after the RLF occurs at the WiFi side, so as to ensure that the distribution service is smooth.

Figure 5:
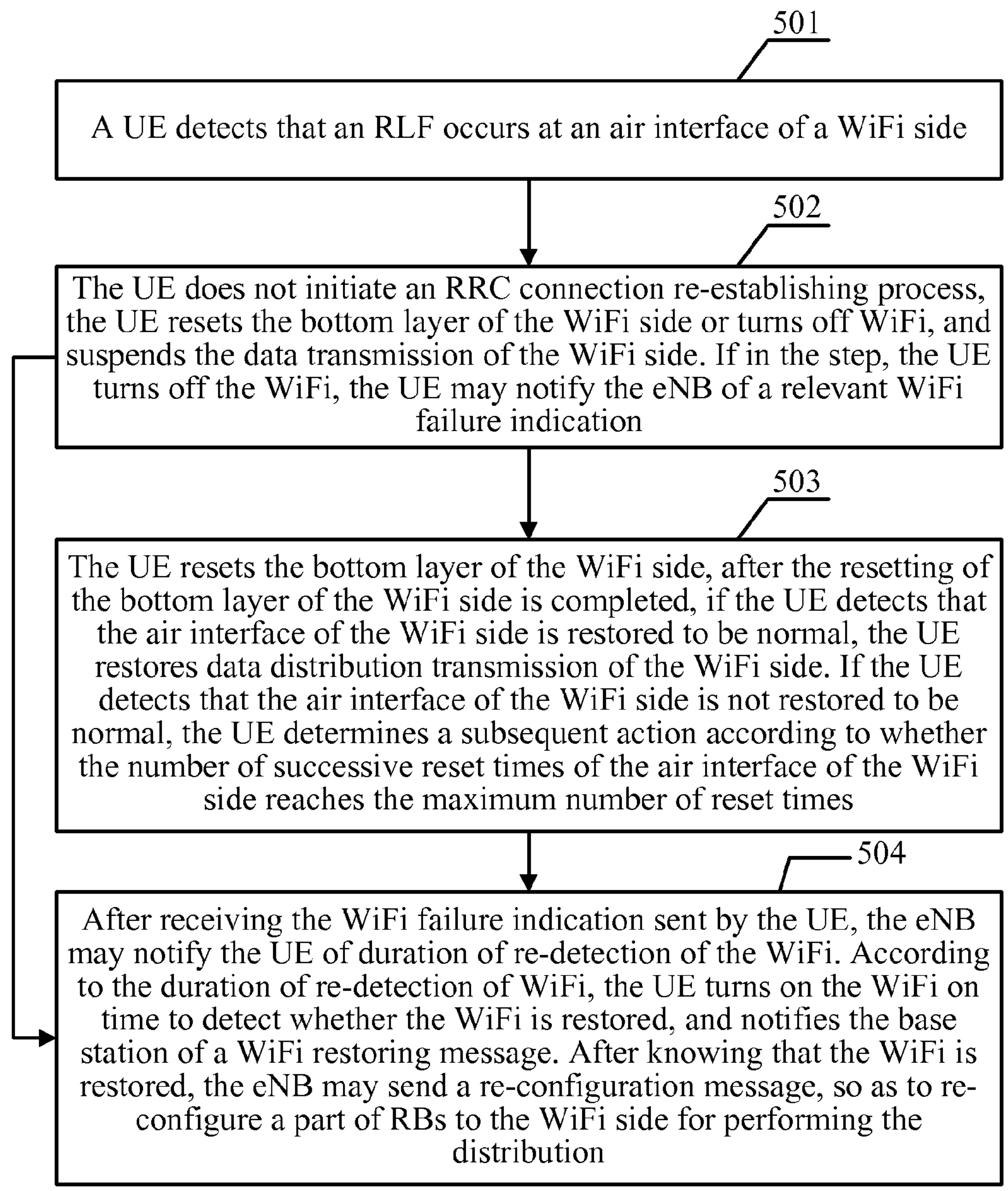
FIG. 5 is a schematic flowchart of a method according to an embodiment of the present invention.

According to another embodiment of the present invention, as shown in FIG. 5, the procedure includes:

501: A base station distributes mobile data for a UE by using a WiFi technology. During a data transmission process, the UE detects that an RLF occurs at an air interface of a WiFi side.

In this embodiment, the distribution of the data is not based on an RB, that is, when the base station instructs the UE to perform data distribution, the base station needs not to indicate that the data of which RB or RBs of the UE is distributed. During a downlink transmission process, the base station may distribute the data of any RB of the UE by using a serving WiFi AP of the UE according to a scheduling policy; and similarly, during an uplink transmission process, for the UE, the distribution may be performed by using the serving WiFi AP according to the scheduling policy.

More specifically, the detecting, by the UE, that the RLF occurs at the air interface of the WiFi side includes: (1) a bottom layer of the WiFi side notifies the UE that a link failure occurs at a distribution scheduling layer; and (2) a statistic packet loss ratio fed back by the bottom layer of the WiFi side is quite high.

502: The UE does not initiate an RRC connection re-establishing process, the UE resets the bottom layer of the WiFi side or turns off the WiFi, and suspends the data transmission of the WiFi side.

Further, if in the step, the UE turns off the WiFi, the UE may notify the eNB base station of a relevant WiFi failure indication.

503: If in 502, the UE resets the bottom layer of the WiFi side, after the resetting of the bottom layer of the WiFi side is completed, if the UE detects that the air interface of the WiFi side is restored to be normal, the UE restores data distribution transmission of the WiFi side.

If the UE detects that the air interface of the WiFi side is not restored to be normal, the UE determines a subsequent action according to whether the number of successive reset times of the air interface of the WiFi side reaches the maximum number of reset times.

More specifically, if the number of successive reset times does not reach the maximum number of reset times, the UE continues resetting the bottom layer of the WiFi side and accumulates the number of reset times. If the number of successive reset times reaches the maximum number of reset times, the UE turns off the WiFi and sends a WiFi failure indication to the eNB base station.

504: After receiving the WiFi failure indication sent by the UE, the base station may notify the UE of duration of re-detection of the WiFi. According to the duration of re-detection of WiFi, the UE turns on the WiFi on time to detect whether the WiFi is restored, and notifies the base station of a WiFi restoring message.

Further, after knowing that the WiFi is restored, the eNB base station may send a re-configuration message, so as to re-configure a part of RBs to the WiFi side for performing the distribution.

This embodiment provides an optional processing solution for restoring the state of the air interface of the wireless fidelity network, thereby implementing the UE access after the RLF occurs at the WiFi side, so as to ensure that the distribution service is smooth.

Figure 6:
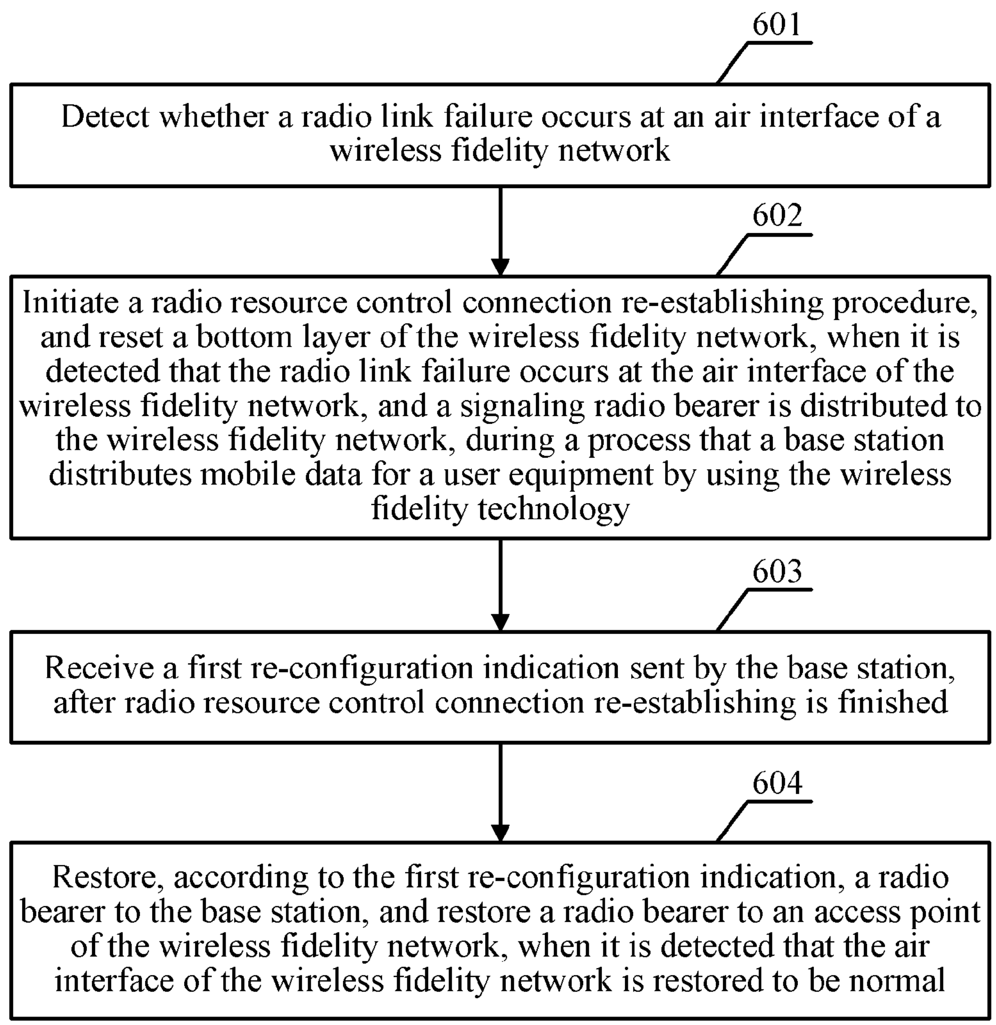
FIG. 6 is a schematic flowchart of a method according to an embodiment of the present invention.

An embodiment of the present invention further provides another processing method of wireless fidelity, as shown in FIG. 6, including:

601: Detect whether a radio link failure occurs at an air interface of a wireless fidelity network.

In 601, the detecting whether the radio link failure occurs at the air interface of the wireless fidelity network includes: any one of detecting whether a radio link failure notification sent by a bottom layer of the wireless fidelity network is received, detecting whether a packet loss ratio exceeds a preset value, and detecting whether the number of retransmission times of a radio link control message of the wireless fidelity network reaches a threshold. It can be understood that it is possible that other situations result in the radio link failure, and the above three examples should not be understood as exhaustion of examples of radio link failures, so that the above examples should not be understood as the limitation of the embodiment of the present invention.

602: Initiate a radio resource control connection re-establishing procedure, and reset a bottom layer of the wireless fidelity network, when it is detected that the radio link failure occurs at the air interface of the wireless fidelity network, and a signaling radio bearer is distributed to the wireless fidelity network, during a process that a base station distributes mobile data for a user equipment by using the wireless fidelity technology.

603: Receive a first re-configuration indication sent by the base station, after radio resource control connection re-establishing is finished.

604: Restore, according to the first re-configuration indication, a radio bearer to the base station, and restore a radio bearer to an access point of the wireless fidelity network, when it is detected that the air interface of the wireless fidelity network is restored to be normal.

In 604, it is required to determine whether the bottom layer of the wireless fidelity network is restored to be normal, and the determining manner of detecting whether the WiFI is restored to be normal may be that: the bottom layer of the WiFi side provides an indication, which indicates whether data can be normally sent and received. The resetting (Reset) refers to the resetting of the bottom layer of the WiFI implemented through rebooting of hardware of the WiFi side. The rebooting of hardware may refer to rebooting of a PHY (Physical, physical) layer/MAC (Medium Access Control, medium access control) layer of the WiFi side, and specifically, the rebooting of the bottom layer of the WiFi side may be that: configuration data of the PHY layer/MAC layer is restored to data during an initial state, so as to implement the resetting of the bottom layer of the WiFi side. In this embodiment, the suspending (Suspend) the radio bearer refers to that the bearer is made to be in a sleep state, and at this time, the data cannot be sent, received, or processed. In this embodiment, when being reset, the bottom layer of the Wifi may not send and receive the data during a period of time, so that the suspending the RB may prevent the data from being sent to the bottom layer of the WiFi for being processed at this time.

In the above embodiment, initiate the radio resource control connection re-establishing procedure, and reset the bottom layer of the wireless fidelity network, when it is detected that the radio link failure occurs at the air interface of the wireless fidelity network, and the signaling radio bearer is distributed to the wireless fidelity network, during the process that the base station distributes mobile data for a user equipment by using the wireless fidelity technology; receive a first re-configuration indication sent by the base station, after the radio resource control connection re-establishing is finished; restore, according to the first re-configuration indication, the radio bearer to the base station, and restore the radio bearer to the access point, when it is detected that the air interface of the wireless fidelity side is restored to be normal, thereby implementing the UE access after the RLF occurs at the WiFi side, so as to ensure that the distribution service is smooth.

Further, when it is detected that the air interface of the wireless fidelity network is not restored to be normal, the method further includes: sending a first message to the base station to inform the base station of a wireless fidelity failure; receiving a second re-configuration indication sent by the base station, where the second re-configuration is used to indicate that the radio bearer configured to the wireless fidelity network by the base station is to be re-configured to a designated network; and scheduling the radio bearer distributed to the wireless fidelity network to the designated network. On the basis of the solution provided by FIG. 6, this embodiment provides a processing solution when the wireless fidelity network is not restored to be normal, thereby implementing the UE access after the RLF occurs at the WiFi side, so as to ensure that the distribution service is smooth.

Further, during the process that the base station distributes the mobile data for the user equipment by using the wireless fidelity technology, when it is detected that the radio link failure occurs at the air interface of the wireless fidelity network, and the signaling radio bearer is not distributed to the wireless fidelity network, the method further includes: sending a first message to the base station to inform the base station of a wireless fidelity failure; receiving a second re-configuration indication sent by the base station, where the second re-configuration is used to indicate that the radio bearer configured to the wireless fidelity network by the base station is to be re-configured to a designated network; and scheduling the radio bearer distributed to the wireless fidelity network to the designated network. On the basis of the solution provided by FIG. 6, this embodiment provides a processing solution when the radio link failure occurs at the air interface of the wireless fidelity network, and the signaling radio bearer is not distributed to the wireless fidelity side: sending a radio resource control message to the base station to inform the base station of a wireless fidelity failure; receiving a second re-configuration indication sent by the base station; and performing data transmission according to the second re-configuration indication.

This embodiment may implement the UE access after the RLF occurs at the WiFi side, so as to ensure that the distribution service is smooth.

In the examples of the embodiments in the following, one side of the distribution is WiFi, and the other side is LTE, where it should be noted that the other side may be other networks, for example, a UMTS (Universal Mobile Telecommunication System, universal mobile telecommunication system), so that the example of the other side network corresponding to the WiFi should not be understood as the limitation of the embodiment of the present invention.

Figure 7:
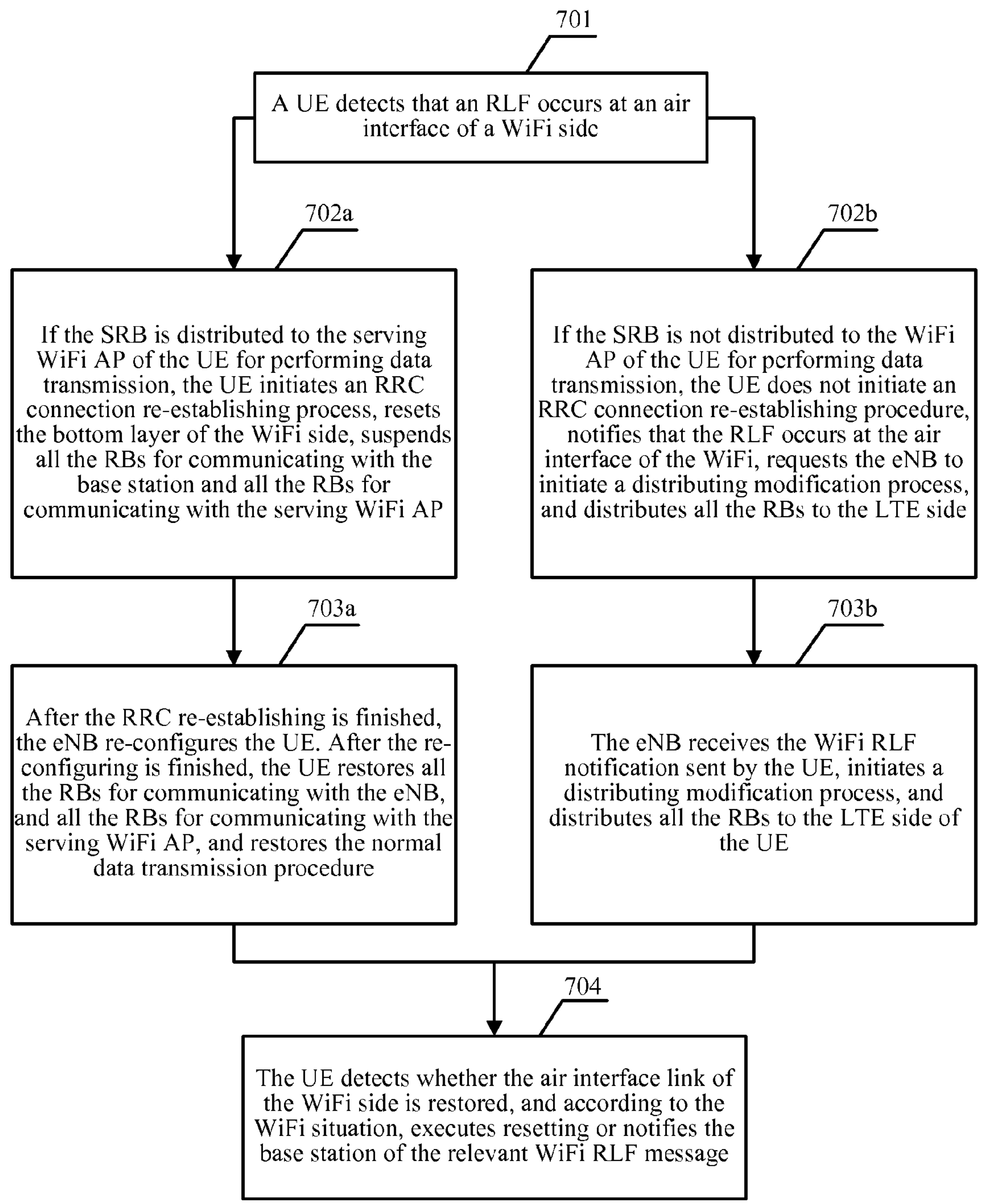
FIG. 7 is a schematic flowchart of a method according to an embodiment of the present invention.

According to another embodiment of the present invention, as shown in FIG. 7, the procedure includes:

701: A base station distributes mobile data for a UE by using a WiFi technology. During a data transmission process, the UE detects that an RLF occurs at an air interface of a WiFi side. If an SRB is distributed to a serving WiFi AP of the UE for performing data transmission, the procedure proceeds to 702*a*; and if the SRB is not distributed to the serving WiFi AP of the UE for performing data transmission, the procedure proceeds to 702*b*.

In this embodiment, the distribution of the data is based on an RB, that is, when the base station instructs the UE to perform data distribution, the base station needs to configure that the data of which RB or RBs of the UE is distributed (that is, it is differentiated whether an SRB may be distributed).

More specifically, the detecting, by the UE, that the RLF occurs at the air interface of the WiFi side includes: (1) a bottom layer of the WiFi side notifies the UE that a link failure occurs at a distribution scheduling layer; (2) a statistic packet loss ratio fed back by the bottom layer of the WiFi side is quite high; and (3) the number of re-transmission times of RLC on the bearer configured to the WiFi side reaches the maximum number of times.

702*a*: If the SRB is distributed to the serving WiFi AP of the UE for performing data transmission, the UE initiates an RRC connection re-establishing process, resets the bottom layer of the WiFi side, suspends all the RBs (except for an SRB0, where the SRB0 is mainly used to bear a signaling of establishing an RRC link before the data transmission) for communicating with the base station and all the RBs for communicating with the serving WiFi AP, and stops a data transmission process with the base station and the WiFi AP. Then, the procedure proceeds to 703*a*.

702*b*: If the SRB is not distributed to the WiFi AP of the UE for performing data transmission, the UE does not initiate an RRC connection re-establishing process, the UE stops data sending with the WiFi AP, notifies that the RLF occurs at the air interface of the WiFi, requests the base station to initiate a distributing modification process, and distributes all the RBs to the LTE side. Then, the procedure proceeds to 703*b*.

More specifically, the message used to notify the base station that the RLF occurs may be a newly designed RRC message, or may also be a new information unit in an existing RRC message. The included content includes, but is not limited to, a failure reason. For example, the failure reason may be a physical link failure and a data sending failure.

703*a*: After the RRC re-establishing is finished, the base station re-configures the UE. After the re-configuring is finished, the UE restores all the RBs for communicating with the base station, and all the RBs for communicating with the serving WiFi AP, and restores the normal data transmission process.

If during the re-configuring process, the base station modifies one or more pieces of RB information distributed to the serving WiFi AP of the UE, the base station correspondingly needs to modify the corresponding connection information with the WiFi AP. One RB between the UE and the serving WiFi AP corresponds to one connection between the WiFi AP and the base station.

703*b*: The base station receives the WiFi RLF notification sent by the UE, initiates a distributing modification process, and distributes all the RBs to the LTE side of the UE.

More specifically, the message used for distributing modification may be a newly designed RRC message, or may also be a new information unit in an existing RRC message.

704: The UE detects whether the air interface link of the WiFi side is restored, and according to the WiFi situation, executes resetting or notifies the base station of the relevant WiFi RLF message. The base station receives the WiFi RLF notification sent by the UE, initiates the distributing modification process, and distributes all the RBs to the LTE side of the UE.

This embodiment provides an optional processing solution for restoring the state of the air interface of the wireless fidelity network, thereby implementing the UE access after the RLF occurs at the WiFi side, so as to ensure that the distribution service is smooth.

Figure 8:
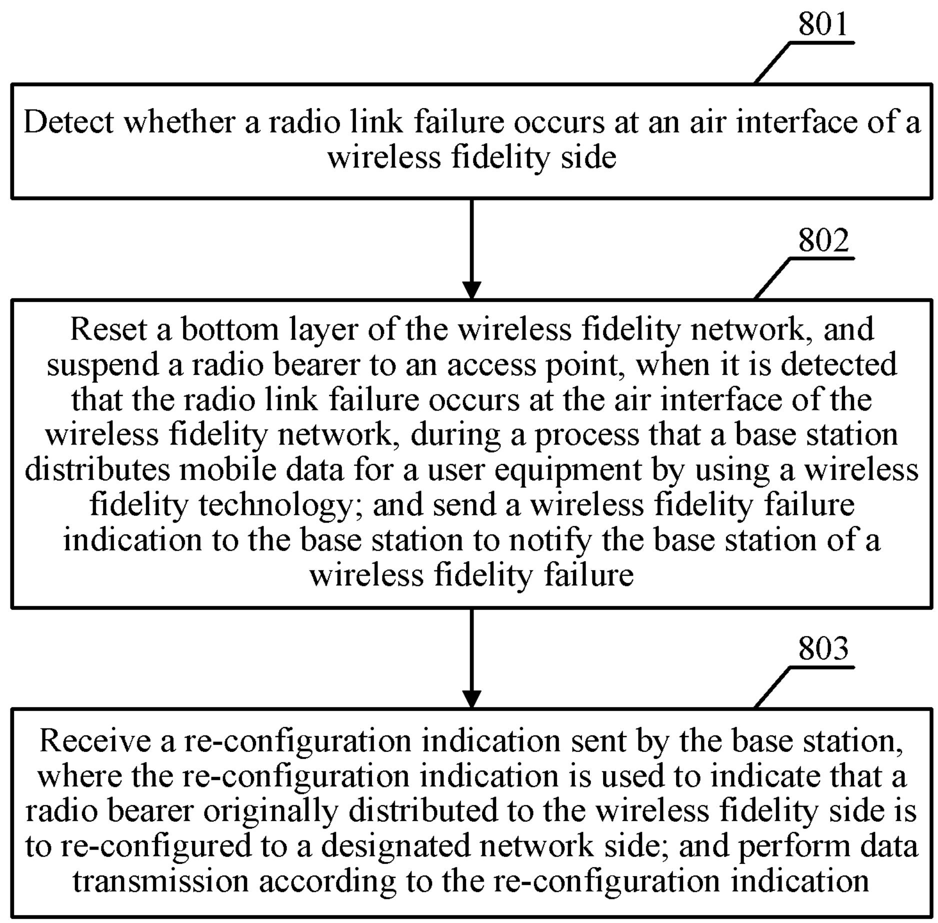
FIG. 8 is a schematic flowchart of a method according to an embodiment of the present invention.

An embodiment of the present invention further provides another processing method of wireless fidelity, as shown in FIG. 8, including:

801: Detect whether a radio link failure occurs at an air interface of a wireless fidelity side.

802: Reset a bottom layer of the wireless fidelity network, and suspend a radio bearer to an access point, when it is detected that the radio link failure occurs at the air interface of the wireless fidelity network, during a process that a base station distributes mobile data for a user equipment by using a wireless fidelity technology; and send a first message (which may be a wireless fidelity failure indication) to the base station to inform the base station of a wireless fidelity failure.

803: Receive a re-configuration indication sent by the base station, where the re-configuration indication is used to indicate that a radio bearer originally distributed to the wireless fidelity side is to be re-configured to a designated network side; and perform data transmission according to the re-configuration indication.

Further, after the sending the first message (which may be the wireless fidelity failure indication) to the base station in 803, the method further includes: receiving an indication sent by the base station, where the indication is used to indicate duration of re-detection of wireless fidelity; detecting, according to the indication, whether the air interface of the wireless fidelity network is restored to be normal, if yes, sending the first message (which may be the wireless fidelity failure indication) to the base station, so as to inform the base station that the air interface of the wireless fidelity side is restored to be normal, and acquiring the radio bearer distributed to the wireless fidelity side and configured by the base station.

In the above embodiment, during the process that the base station distributes the mobile data for the user equipment by using the wireless fidelity, if the radio link failure occurs at the air interface of the wireless fidelity side, directly execute: resetting the bottom layer of the wireless fidelity side, and suspending the radio bearer to the access point; sending the first message (which may be the wireless fidelity failure indication) to the base station to inform the base station of the wireless fidelity failure; receiving the re-configuration indication sent by the base station; and performing the data transmission according to the re-configuration indication.

This embodiment may implement the UE access after the RLF occurs at the WiFi side, so as to ensure that the distribution service is smooth.

In the examples of the embodiments in the following, one side of the distribution is WiFi, and the other side is LTE, where it should be noted that the other side may be other networks, for example, a UMTS (Universal Mobile Telecommunication System, universal mobile telecommunication system), so that the example of the other side network corresponding to the WiFi should not be understood as the limitation of the embodiment of the present invention.

Figure 9:
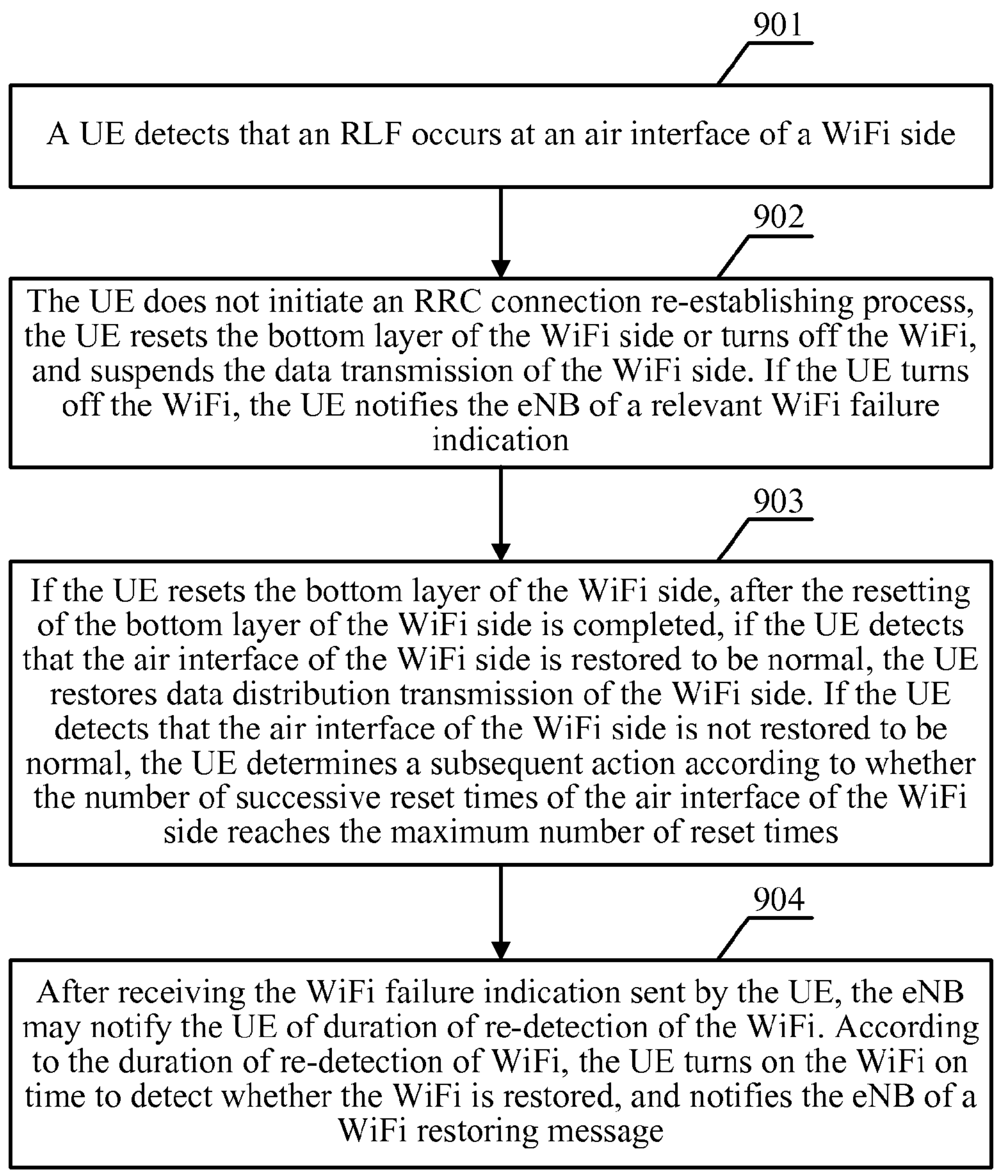
FIG. 9 is a schematic flowchart of a method according to an embodiment of the present invention.

According to another embodiment of the present invention, as shown in FIG. 9, the procedure includes:

901: A base station distributes mobile data for a UE by using a WiFi technology. During a data transmission process, the UE detects that an RLF occurs at an air interface of a WiFi side.

In this embodiment, the distribution of the data is not based on an RB, that is, when the base station instructs the UE to perform data distribution, the base station needs not to indicate that the data of which RB or RBs of the UE is distributed. During a downlink transmission process, the base station may distribute the data of any RB of the UE by using a serving WiFi AP of the UE according to a scheduling policy; and similarly, during an uplink transmission process, for the UE, the distribution may be performed by using the serving WiFi AP according to the scheduling policy. The application scenario of this embodiment may further be that: the distribution of the data is based on an RB, that is, when the base station instructs the UE to perform data distribution, the base station needs to configure that the data of which RB or RBs of the UE is distributed (that is, it is differentiated whether an SRB may be distributed)

More specifically, the detecting, by the UE, that the RLF occurs at the air interface of the WiFi side includes: (1) a bottom layer of the WiFi side notifies the UE that a link failure occurs at a distribution scheduling layer; and (2) a statistic packet loss ratio fed back by the bottom layer of the WiFi side is quite high.

902: The UE does not initiate an RRC connection re-establishing process, the UE resets the bottom layer of the WiFi side or turns off the WiFi, and suspends the data transmission of the WiFi side. If the UE turns off the WiFi, the UE may notify the base station of a relevant WiFi failure indication.

903: If the UE resets the bottom layer of the WiFi side, after the resetting of the bottom layer of the WiFi side is completed, if the UE detects that the air interface of the WiFi side is restored to be normal, the UE restores data distribution transmission of the WiFi side. If the UE detects that the air interface of the WiFi side is not restored to be normal, the UE determines a subsequent action according to whether the number of successive reset times of the air interface of the WiFi side reaches the maximum number of reset times. More specifically, if the number of successive reset times does not reach the maximum number of reset times, the UE continues resetting the bottom layer of the WiFi side and accumulates the number of reset times. If the number of successive reset times reaches the maximum number of reset times, the UE turns off the WiFi and sends a WiFi failure indication to the base station.

904: After receiving the WiFi failure indication sent by the UE, the base station may notify the UE of duration of re-detection of the WiFi. According to the duration of re-detection of WiFi, the UE may turn on the WiFi on time to detect whether the WiFi is restored, and notify the base station of a WiFi restoring message. After knowing that the WiFi is restored, the base station may send a re-configuration message, so as to re-configure a part of RBs to the WiFi side for performing the distribution.

This embodiment provides an optional processing solution for restoring the state of the air interface of the wireless fidelity network, thereby implementing the UE access after the RLF occurs at the WiFi side, so as to ensure that the distribution service is smooth.

Figure 10:
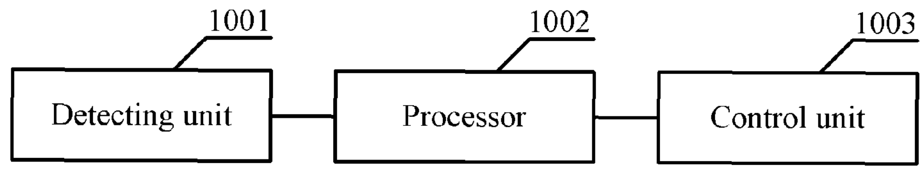
FIG. 10 is a schematic structural diagram of a user equipment according to an embodiment of the present invention.

An embodiment of the present invention provides a user equipment, configured to execute actions in each method embodiment, as shown in FIG. 10, the user equipment includes:

a detecting unit 1001, configured to detect whether a radio link failure occurs at an air interface of a wireless fidelity network;

The detecting whether the radio link failure occurs at the air interface of the wireless fidelity network includes: any one of detecting whether a radio link failure notification sent by a bottom layer of the wireless fidelity network is received, detecting whether a packet loss ratio exceeds a preset value, and detecting whether the number of re-transmission times of a radio link control message of the wireless fidelity network reaches a threshold. It can be understood that it is possible that other situations result in the radio link failure, and the above three examples should not be understood as exhaustion of examples of radio link failures, so that the above examples should not be understood as the limitation of the embodiment of the present invention.

a processor 1002, configured to reset a bottom layer of the wireless fidelity network, and suspend a radio bearer to an access point of the wireless fidelity network, when it is detected that the radio link failure occurs at the air interface of the wireless fidelity network, during a process that a base station distributes mobile data for a user equipment by using the wireless fidelity technology; and a control unit 1003, configured to restore the radio bearer to the access point of the wireless fidelity network, when the resetting of the bottom layer of the wireless fidelity network is completed, and it is detected that the air interface of the wireless fidelity network is restored to be normal.

During the executing process of the control unit 1003, the determining manner of detecting whether the WiFI is restored to be normal may be that: the bottom layer of the WiFi side provides an indication, which indicates whether data can be normally sent and received. The resetting (Reset) refers to the resetting of the bottom layer of the WiFi implemented through rebooting of hardware of the WiFi side. The rebooting of hardware may refer to rebooting of a PHY (Physical, physical) layer/MAC (Medium Access Control, medium access control) layer of the WiFi side, and specifically, the rebooting of the bottom layer of the WiFi side may be that: configuration data of the PHY layer/MAC layer is restored to data during an initial state, so as to implement the resetting of the bottom layer of the WiFi side. In this embodiment, the suspending (Suspend) the radio bearer refers to that the bearer is made to be in a sleep state, and at this time, the data cannot be sent, received, or processed. In this embodiment, when being reset, the bottom layer of the Wifi may not send and receive the data during a period of time, so that the suspending the RB performed by the processor 1002 may prevent the data from being sent to the bottom layer of the WiFi for being processed at this time.

In the above embodiment, reset the bottom layer of the wireless fidelity side, and suspend the radio bearer to the access point, if the radio link failure occurs at the air interface of the wireless fidelity side, during the process that the base station distributes the mobile data for the user equipment by using the wireless fidelity; and restore the radio bearer for communicating with the access point, after it is detected that the air interface of the wireless fidelity side is restored to be normal, thereby implementing the UE access after the RLF occurs at the WiFi side, so as to ensure that the distribution service is smooth.

Figure 11:
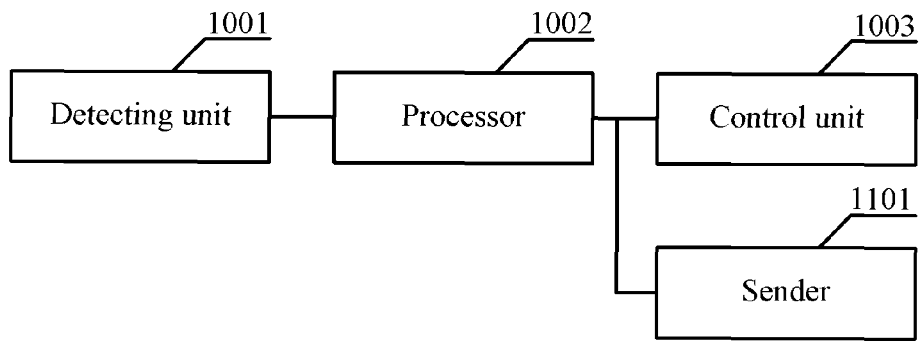
FIG. 11 is a schematic structural diagram of a user equipment according to an embodiment of the present invention.

Furthermore, as shown in FIG. 11, the user equipment may further include:

a sender 1101, configured to send a first message to the base station to inform the base station of a wireless fidelity failure, after the resetting of the bottom layer of the wireless fidelity network is completed, and when the air interface of the wireless fidelity network is still not restored to be normal. This embodiment provides a solution after the resetting of the bottom layer of the wireless fidelity network is completed, and when the air interface of the wireless fidelity network is still not restored to be normal, thereby implementing the UE access after the RLF occurs at the WiFi side, so as to ensure that the distribution service is smooth.

Further, the processor 1002 is further configured to:

accumulate the number of reset times of the bottom layer of the wireless fidelity network, and determine whether the number of reset times of the bottom layer of the wireless fidelity network reaches a preset threshold; if yes, and the air interface of the wireless fidelity network is not restored to be normal, the sender 1101 sends the first message to the base station to inform the base station of the wireless fidelity failure; and if no, the processor 1002 continues resetting the bottom layer of the wireless fidelity network. This embodiment provides an optional solution of determining whether the bottom layer of the wireless network is restored to be normal, thereby implementing the UE access after the RLF occurs at the WiFi side, so as to ensure that the distribution service is smooth.

Figure 12:
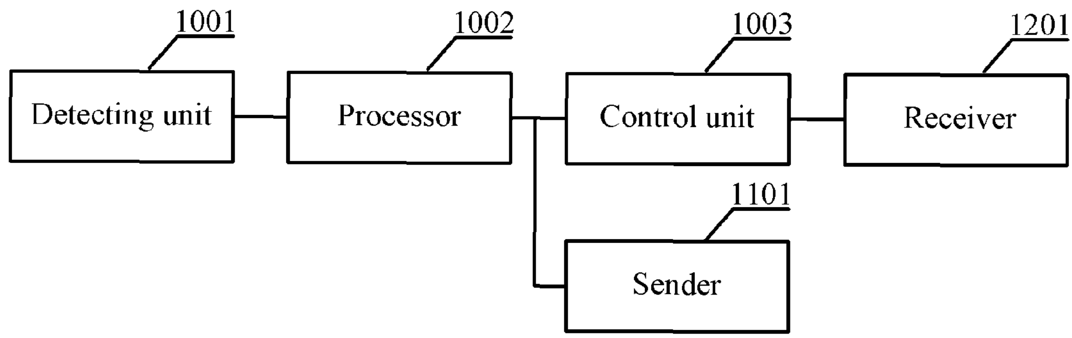
FIG. 12 is a schematic structural diagram of a user equipment according to an embodiment of the present invention.

Furthermore, as shown in FIG. 12, the user equipment may further include:

a receiver 1201, configured to receive a re-configuration indication sent by the base station, after the first message is sent to the base station to inform the base station of the wireless fidelity failure, where the re-configuration indication is used to indicate that a radio bearer distributed to the wireless fidelity network is to be re-configured to a designated network. In this embodiment, on the basis of the above embodiments, the base station sends the re-configuration indication to control the network access, thereby implementing the UE access after the RLF occurs at the WiFi side, so as to ensure that the distribution service is smooth.

Further, the receiver 1201 is further configured to receive an indication sent by the base station, where the indication is used to indicate duration of re-detection of wireless fidelity.

The processor 1002 is further configured to detect, according to the indication, whether the air interface of the wireless fidelity network is restored to be normal.

The sender 1101 is further configured to send a second message to the base station, if it is detected that the air interface of the wireless fidelity network is restored to be normal, so as to inform the base station that the air interface of the wireless fidelity network is restored to be normal.

The control unit 1003 is further configured to acquire the radio bearer distributed to the wireless fidelity network and configured by the base station, after the second message is sent to the base station.

On the basis of the above embodiment, this embodiment provides an optional processing solution for restoring the state of the air interface of the wireless fidelity network, thereby implementing the UE access after the RLF occurs at the WiFi side, so as to ensure that the distribution service is smooth.

Figure 13:
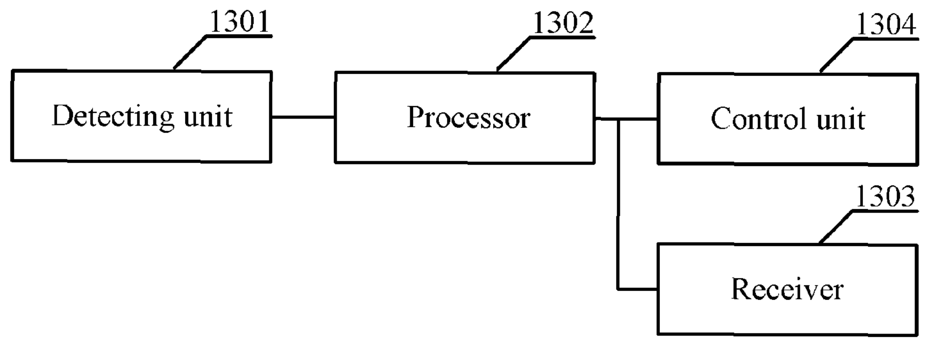
FIG. 13 is a schematic structural diagram of a user equipment according to an embodiment of the present invention.

An embodiment of the present invention further provides another user equipment, as shown in FIG. 13, the user equipment includes:

a detecting unit 1301, configured to detect whether a radio link failure occurs at an air interface of a wireless fidelity network;

The detecting whether the radio link failure occurs at the air interface of the wireless fidelity network includes: any one of detecting whether a radio link failure notification sent by a bottom layer of the wireless fidelity network is received, detecting whether a packet loss ratio exceeds a preset value, and detecting whether the number of retransmission times of a radio link control message of the wireless fidelity network reaches a threshold. It can be understood that it is possible that other situations result in the radio link failure, and the above three examples should not be understood as exhaustion of examples of radio link failures, so that the above examples should not be understood as the limitation of the embodiment of the present invention.

a processor 1302, configured to initiate a radio resource control connection re-establishing procedure, and reset a bottom layer of the wireless fidelity network, when it is detected that the radio link failure occurs at the air interface of the wireless fidelity network, and a signaling radio bearer is distributed to the wireless fidelity network, during a process that a base station distributes mobile data for a user equipment by using the wireless fidelity technology;

a receiver 1303, configured to receive a first re-configuration indication sent by the base station, after radio resource control connection re-establishing is finished; and a control unit 1304, configured to restore, according to the first re-configuration indication, a radio bearer to the base station, and restore a radio bearer to an access point of the wireless fidelity network, when it is detected that the air interface of the wireless fidelity network is restored to be normal.

During the executing process of the control unit 1304, the determining manner of detecting whether the WiFI is restored to be normal may be that: the bottom layer of the WiFi side provides an indication, which indicates whether data may be normally sent and received. The resetting (Reset) refers to the resetting of the bottom layer of the WiFI implemented through rebooting of hardware of the WiFi side. The rebooting of hardware may refer to rebooting of a PHY (Physical, physical) layer/MAC (Medium Access Control, medium access control) layer of the WiFi side, and specifically, the rebooting of the bottom layer of the WiFi side may be that: configuration data of the PHY layer/MAC layer is restored to data during an initial state, so as to implement the resetting of the bottom layer of the WiFi side. In this embodiment, the suspending (Suspend) the radio bearer refers to that the bearer is made to be in a sleep state, and at this time, the data cannot be sent, received, or processed. In this embodiment, when being reset, the bottom layer of the Wifi may not send and receive the data during a period of time, so that the suspending the RB may prevent the data from being sent to the bottom layer of the WiFi for being processed at this time.

In the above embodiment, initiate the radio resource control connection re-establishing procedure, and reset the bottom layer of the wireless fidelity side, when it is detected that the radio link failure occurs at the air interface of the wireless fidelity side, and the signaling radio bearer is distributed to the wireless fidelity side, during the process that the base station distributes mobile data for a user equipment by using the wireless fidelity; receive a first re-configuration indication sent by the base station, after the radio resource control connection re-establishing is finished; restore, according to the first re-configuration indication, the radio bearer to the base station, and restore the radio bearer to the access point, when it is detected that the air interface of the wireless fidelity side is restored to be normal, thereby implementing the UE access after the RLF occurs at the WiFi side, so as to ensure that the distribution service is smooth.

Figure 14:
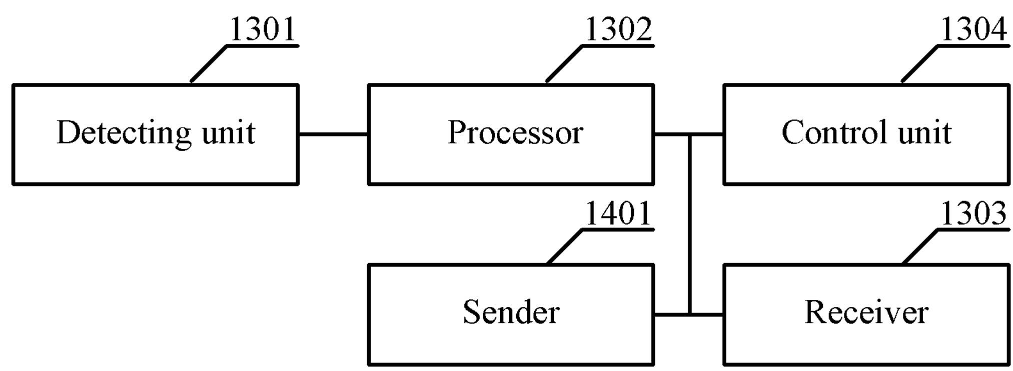
FIG. 14 is a schematic structural diagram of a user equipment according to an embodiment of the present invention.

Furthermore, as shown in FIG. 14, the user equipment may further include:

a sender 1401, configured to send a first message to the base station to inform the base station of a wireless fidelity failure, when it is detected that the air interface of the wireless fidelity network is not restored to be normal, where the receiver 1303 is further configured to receive a second re-configuration indication sent by the base station, where the second re-configuration is used to indicate that the radio bearer configured to the wireless fidelity network by the base station is to be re-configured to a designated network.

On the basis of the solution provided by FIG. 12, this embodiment provides a processing solution when the wireless fidelity network is not restored to be normal, thereby implementing the UE access after the RLF occurs at the WiFi side, so as to ensure that the distribution service is smooth.

Further, the sender 1401 is further configured to send a first message to the base station to inform the base station of a wireless fidelity failure, when it is detected that the radio link failure occurs at the air interface of the wireless fidelity network, and the signaling radio bearer is not distributed to the wireless fidelity network, during the process that the base station distributes the mobile data for the user equipment by using the wireless fidelity technology.

In this embodiment, on the basis of the solution corresponding to FIG. 12 or FIG. 12, this embodiment provides a processing solution when the radio link failure occurs at the air interface of the wireless fidelity side, and the signaling radio bearer is not distributed to the wireless fidelity side: sending a radio resource control message to the base station to inform the base station of a wireless fidelity failure; receiving a second re-configuration indication sent by the base station; and performing data transmission according to the second re-configuration indication, thereby implementing the UE access after the RLF occurs at the WiFi side, so as to ensure that the distribution service is smooth.

Figure 15:
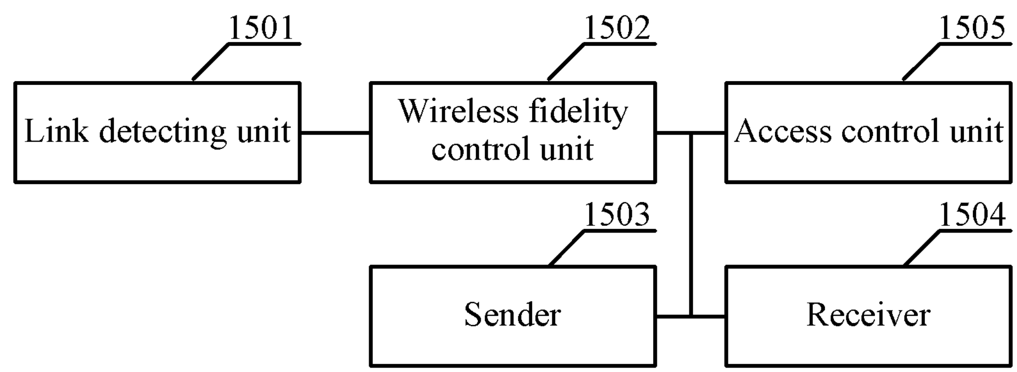
FIG. 15 is a schematic structural diagram of a user equipment according to an embodiment of the present invention.

An embodiment of the present invention further provides a user equipment, configured to execute actions in each method embodiment, as shown in FIG. 15, the user equipment includes:

a link detecting unit 1501, configured to detect whether a radio link failure occurs at an air interface of a wireless fidelity side;

The detecting whether the radio link failure occurs at the air interface of the wireless fidelity network includes: any one of detecting whether a radio link failure notification sent by a bottom layer of the wireless fidelity network is received, detecting whether a packet loss ratio exceeds a preset value, and detecting whether the number of retransmission times of a radio link control message of the wireless fidelity network reaches a threshold. It can be understood that it is possible that other situations result in the radio link failure, and the above three examples should not be understood as exhaustion of examples of radio link failures, so that the above examples should not be understood as the limitation of the embodiment of the present invention.

a wireless fidelity control unit 1502, configured to reset a bottom layer of the wireless fidelity side, and suspend a radio bearer to an access point, when it is detected that the radio link failure occurs at the air interface of the wireless fidelity side, during a process that a base station distributes mobile data for a user equipment by using wireless fidelity;

a sender 1503, configured to send a first message (which may be a wireless fidelity failure indication) to the base station to inform the base station of a wireless fidelity failure, when it is detected that the radio link failure occurs at the air interface of the wireless fidelity side, during the process that the base station distributes the mobile data for the user equipment by using the wireless fidelity;

a receiver 1504, configured to receive a re-configuration indication sent by the base station, after the first message (which may be a wireless fidelity failure indication) is sent to the base station to inform the base station of the wireless fidelity failure, where the re-configuration indication is used to indicate that a radio bearer originally distributed to the wireless fidelity side is to be re-configured to a designated network side; and an access control unit 1505, configured to perform data transmission according to the re-configuration indication.

In the above embodiment, during the process that the base station distributes the mobile data for the user equipment by using the wireless fidelity, if the radio link failure occurs at the air interface of the wireless fidelity side, directly execute: resetting the bottom layer of the wireless fidelity side, and suspending the radio bearer to the access point; sending the first message (which may be the wireless fidelity failure indication) to the base station to inform the base station of the wireless fidelity failure; receiving the re-configuration indication sent by the base station; and performing the data transmission according to the re-configuration indication, thereby implementing the UE access after the RLF occurs at the WiFi side, so as to ensure that the distribution service is smooth.

Further, the receiver 1504 is further configured to receive an indication sent by the base station, after the first message (which may be a wireless fidelity failure indication) is sent to the base station, where the indication is used to indicate duration of re-detection of wireless fidelity.

The link detecting unit 1501 is further configured to detect, according to the indication, whether the air interface of the wireless fidelity side is restored to be normal.

The determining manner of detecting whether the WiFI is restored to be normal may be that: the bottom layer of the WiFi side provides an indication, which indicates whether data can be normally sent and received. The resetting (Reset) refers to the resetting of the bottom layer of the WiFi implemented through rebooting of hardware of the WiFi side. The rebooting of hardware may refer to rebooting of a PHY (Physical, physical) layer/MAC (Medium Access Control, medium access control) layer of the WiFi side, and specifically, the rebooting of the bottom layer of the WiFi side may be that: configuration data of the PHY layer/MAC layer is restored to data during an initial state, so as to implement the resetting of the bottom layer of the WiFi side. In this embodiment, the suspending (Suspend) the radio bearer refers to that the bearer is made to be in a sleep state, and at this time, the data cannot be sent, received, or processed. In this embodiment, when being reset, the bottom layer of the Wifi may not send and receive the data during a period of time, so that the suspending the RB may prevent the data from being sent to the bottom layer of the WiFi for being processed at this time.

The sender 1503 is further configured to send the first message (which may be a wireless fidelity failure indication) to the base station, when it is detected that the air interface of the wireless fidelity side is restored to be normal, so as to inform the base station that the air interface of the wireless fidelity side is restored to be normal.

The receiver 1504 is further configured to acquire the radio bearer distributed to the wireless fidelity side and configured by the base station, after the first message (which may be a wireless fidelity failure indication) is sent to the base station.

In the above embodiment, during the process that the base station distributes the mobile data for the user equipment by using the wireless fidelity, if the radio link failure occurs at the air interface of the wireless fidelity side, directly execute: resetting the bottom layer of the wireless fidelity side, and suspending the radio bearer to the access point; sending the first message (which may be the wireless fidelity failure indication) to the base station to inform the base station of the wireless fidelity failure; receiving the re-configuration indication sent by the base station; and performing the data transmission according to the re-configuration indication, thereby implementing the UE access after the RLF occurs at the WiFi side, so as to ensure that the distribution service is smooth.

It should be noted that in the above user equipment embodiments, the included units are divided only according to logical functions, but the present invention is not limited to the division, as long as corresponding functions can be realized; and specific names of the function units are provided merely for the purpose of distinguishing the units from one another, but not intended to limit the scope of the present invention.

Additionally, persons of ordinary skill in the art should understand that, all or a part of the steps in the method according to the embodiments may be implemented by a program instructing relevant hardware. The corresponding program may be stored in a computer readable storage medium. The storage medium may be a read-only memory, a magnetic disk, an optical disk or the like.

The above descriptions are merely exemplary embodiments of the present invention, but the protection scope of the present invention is not limited thereto. Any modification or replacement readily figured out by persons skilled in the art within the technical scope disclosed in the present invention should fall within the protection scope of the present invention. Therefore, the protection scope of the present invention is subject to the protection scope of the claims.

What is claimed is:

1. A processing method of a wireless fidelity technology, comprising:

detecting whether a radio link failure occurs at an air interface of a wireless fidelity network;

resetting a physical layer of the wireless fidelity network, and suspending a radio bearer to an access point of the wireless fidelity network, when the radio link failure occurs at the air interface of the wireless fidelity network, during a process that a base station distributes mobile data for user equipment by using the wireless fidelity technology;

restoring the radio bearer to the access point of the wireless fidelity network, when the resetting of the physical layer of the wireless fidelity network is completed, and the air interface of the wireless fidelity network is restored to be normal;

accumulating a number of reset times of the physical layer of the wireless fidelity network;

continuing to reset the physical layer of the wireless fidelity network until the number of reset times of the physical layer of the wireless fidelity network reaches a preset threshold; and sending a first message to the base station to inform the base station of a wireless fidelity failure, when the number of reset times of the physical layer of the wireless fidelity network reaches the preset threshold and the air interface of the wireless fidelity network is not restored to be normal.

2. The method according to claim 1, wherein after the sending of the first message to the base station to inform the base station of the wireless fidelity failure, the method further comprises: receiving a re-configuration indication sent by the base station, wherein the re-configuration indication is used to indicate that a radio bearer distributed to the wireless fidelity network is to be re-configured to a designated network.

3. The method according to claim 2, further comprising:

receiving an indication sent by the base station, wherein the indication is used to indicate duration of re-detection of wireless fidelity;

detecting, according to the indication, whether the air interface of the wireless fidelity network is restored to be normal; and if yes, sending a second message to the base station, so as to inform the base station that the air interface of the wireless fidelity network is restored to be normal, and acquiring the radio bearer distributed to the wireless fidelity network and configured by the base station.

4. The method according to claim 1, wherein the detecting whether the radio link failure occurs at the air interface of the wireless fidelity network comprises at least one of the following: detecting whether a radio link failure notification sent by the physical layer of the wireless fidelity network is received, detecting whether a packet loss ratio exceeds a preset value, and detecting whether the number of retransmission times of a radio link control message of the wireless fidelity network reaches a threshold.

5. A processing method of a wireless fidelity technology, comprising:

detecting whether a radio link failure occurs at an air interface of a wireless fidelity network;

initiating a radio resource control connection re-establishing procedure, and resetting a physical layer of the wireless fidelity network, when the radio link failure is detected at the air interface of the wireless fidelity network, and a signaling radio bearer is distributed to the wireless fidelity network, during a process that a base station distributes mobile data for user equipment by using the wireless fidelity technology;

receiving a first re-configuration indication sent by the base station, after radio resource control connection re-establishing is finished;

restoring, according to the first re-configuration indication, a radio bearer to the base station, and restoring a radio bearer to an access point of the wireless fidelity network, when the air interface of the wireless fidelity network has been restored to be normal;

accumulating a number of reset times of the physical layer of the wireless fidelity network;

continuing to reset the physical layer of the wireless fidelity network until the number of reset times of the physical layer of the wireless fidelity network reaches a preset threshold; and sending a first message to the base station to inform the base station of a wireless fidelity failure when the number of reset times of the physical layer of the wireless fidelity network reaches the preset threshold and the air interface of the wireless fidelity network is not restored to be normal.

6. The method according to claim 5, further comprising receiving a second re-configuration indication sent by the base station, wherein the second re-configuration is used to indicate that the radio bearer configured to the wireless fidelity network by the base station is to be re-configured to a designated network.

7. The method according to claim 5, further comprising sending a second message to the base station to inform the base station of a wireless fidelity failure, when the radio link failure is detected at the air interface of the wireless fidelity network, and the signaling radio bearer is not distributed to the wireless fidelity network, during the process that the base station distributes the mobile data for the user equipment by using the wireless fidelity technology; and receiving a second re-configuration indication sent by the base station, wherein the second re-configuration is used to indicate that the radio bearer configured to the wireless fidelity network by the base station is to be re-configured to a designated network.

8. User equipment, comprising:

a memory storing instructions; and at least one processor, configured to execute the instructions to detect whether a radio link failure occurs at an air interface of a wireless fidelity network; reset a physical layer of the wireless fidelity network, and suspend a radio bearer to an access point of the wireless fidelity network, when the radio link failure is detected at the air interface of the wireless fidelity network, during a process that a base station distributes mobile data for user equipment by using a wireless fidelity technology;

restore the radio bearer to the access point of the wireless fidelity network, when the resetting of the physical layer of the wireless fidelity network is completed, and the air interface of the wireless fidelity network has been restored to be normal;

accumulate a number of reset times of the physical layer of the wireless fidelity network; and determine whether a number of reset times of the physical layer of the wireless fidelity network reaches a preset threshold; if yes, and the air interface of the wireless fidelity network is not restored to be normal, send a first message to the base station to inform the base station of the wireless fidelity failure; and if no, continue to reset the physical layer of the wireless fidelity network.

9. The user equipment according to claim 8, further comprising: a receiver configured to receive a re-configuration indication sent by the base station, after the first message is sent to the base station to inform the base station of the wireless fidelity failure, wherein the re-configuration indication is used to indicate that a radio bearer distributed to the wireless fidelity network is to be re-configured to a designated network.

10. The user equipment according to claim 9, wherein:

the receiver is further configured to receive an indication sent by the base station, wherein the indication is used to indicate duration of re-detection of wireless fidelity;

the processor is further configured to detect, according to the indication, whether the air interface of the wireless fidelity network is restored to be normal;

the sender is further configured to send a second message to the base station, when the air interface of the wireless fidelity side has been restored to be normal, so as to inform the base station that the air interface of the wireless fidelity network is restored to be normal; and the at least one processor is further configured to acquire the radio bearer distributed to the wireless fidelity network and configured by the base station.

11. User equipment, comprising:

a detecting unit configured to detect whether a radio link failure occurs at an air interface of a wireless fidelity network;

a processor configured to initiate a radio resource control connection re-establishing procedure, and reset a physical layer of the wireless fidelity network, when the radio link failure is detected at the air interface of the wireless fidelity network, and a signaling radio bearer is distributed to the wireless fidelity network, during a process that a base station distributes mobile data for user equipment by using a wireless fidelity technology;

a receiver configured to receive a first re-configuration indication sent by the base station, after radio resource control connection re-establishing is finished;

a controller configured to restore, according to the first re-configuration indication, a radio bearer to the base station, and restore a radio bearer to an access point of the wireless fidelity network, when the air interface of the wireless fidelity network has been restored to be normal;

an accumulator configured to accumulate a number of reset times of the physical layer of the wireless fidelity network; and a sender configured to send a first message to the base station to inform the base station of a wireless fidelity failure when the number of reset times of the physical layer of the wireless fidelity network reaches a preset threshold and the air interface of the wireless fidelity network is not restored to be normal.

12. The user equipment according to claim 11, wherein the receiver is further configured to receive a second re-configuration indication sent by the base station, wherein the second re-configuration is used to indicate that the radio bearer configured to the wireless fidelity network by the base station is to be re-configured to a designated network.

13. The user equipment according to claim 12, wherein: the sender is further configured to send a second message to the base station to inform the base station of the wireless fidelity failure, when the radio link failure is detected at the air interface of the wireless fidelity network, and the signaling radio bearer is not distributed to the wireless fidelity network, during the process that the base station distributes the mobile data for the user equipment by using the wireless fidelity technology.

* * * * *